US010794223B2

(12) United States Patent
Rogers et al.

(10) Patent No.: US 10,794,223 B2
(45) Date of Patent: Oct. 6, 2020

(54) ENCLOSED JACKING INSERT

(71) Applicant: UNITED TECHNOLOGIES CORPORATION, Farmington, CT (US)

(72) Inventors: Daniel S. Rogers, Arundale, ME (US); Stephen W. Milks, Sanford, ME (US); Steven J. Feigleson, Waverly, GA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 119 days.

(21) Appl. No.: 15/840,348

(22) Filed: Dec. 13, 2017

(65) Prior Publication Data

US 2018/0112558 A1    Apr. 26, 2018

Related U.S. Application Data

(62) Division of application No. 14/600,239, filed on Jan. 20, 2015, now Pat. No. 9,879,565.

(51) Int. Cl.
   *F01D 25/24*    (2006.01)
   *F01D 9/04*     (2006.01)
   *F16B 37/12*    (2006.01)
   *F01D 5/00*     (2006.01)

(52) U.S. Cl.
   CPC ........... *F01D 25/243* (2013.01); *F01D 5/005* (2013.01); *F01D 9/042* (2013.01); *F01D 25/246* (2013.01); *F16B 37/122* (2013.01)

(58) Field of Classification Search
   CPC ........... F01D 25/24–246; F01D 25/265; F01D 25/28; F01D 9/042; F01D 5/005; F04D 1/066; F04D 29/54; F16L 17/06; F16L 19/02; F16L 23/02; F05B 2230/70; F05B 2230/80; B23P 6/002; B23P 6/00
   USPC ...................................... 29/889.1; 415/214.1
   See application file for complete search history.

(56) References Cited

U.S. PATENT DOCUMENTS

| 4,832,574 A * | 5/1989 | Woodwell .............. F01D 5/025 416/244 A |
| 6,126,355 A | 10/2000 | Clover, Jr. |
| 6,435,820 B1 * | 8/2002 | Overberg .............. F01D 25/246 415/1 |
| 6,641,326 B2 | 11/2003 | Schilling |

(Continued)

FOREIGN PATENT DOCUMENTS

WO    2014150353    9/2014

OTHER PUBLICATIONS

Extended European Search Report dated Jun. 24, 2016 in European Application No. 16151959.0.

(Continued)

*Primary Examiner* — Kenneth Bomberg
*Assistant Examiner* — Hakeem M Abdellaoui
(74) *Attorney, Agent, or Firm* — Snell & Wilmer, L.L.P.

(57) ABSTRACT

A case assembly is provided. The case assembly comprises a first flange and a spot face in the first flange. The spot face has a D-shaped perimeter. A jacking insert is disposed in the spot face and has a D-shaped geometry. A threaded cylinder extends from the jacking insert into the first flange. A jacking insert is also provided. The jacking insert comprises a flat portion having a D-shaped geometry and a cylindrical portion having an internal thread configured to interface with a bolt.

5 Claims, 5 Drawing Sheets

(56) References Cited

U.S. PATENT DOCUMENTS

| | | |
|---|---|---|
| 7,185,499 B2 | 3/2007 | Chereau |
| 10,400,810 B2* | 9/2019 | Leutard ................. F16B 37/122 |
| 10,422,238 B2* | 9/2019 | Lacombe ................ F01D 9/041 |
| 2003/0118399 A1* | 6/2003 | Schilling ............... F16B 5/0275 |
| | | 403/337 |
| 2004/0258522 A1* | 12/2004 | Dix ......................... F01D 5/066 |
| | | 416/94 |
| 2008/0193289 A1* | 8/2008 | Khanin ................... F01D 9/042 |
| | | 415/209.2 |
| 2010/0101065 A1* | 4/2010 | Macchia ............... F01D 25/285 |
| | | 29/259 |
| 2011/0070078 A1* | 3/2011 | Paprotna .............. F01D 11/005 |
| | | 415/214.1 |
| 2014/0037442 A1 | 2/2014 | Tatman et al. |
| 2016/0312656 A1* | 10/2016 | Pergantis .............. B25B 27/023 |
| 2017/0219002 A1* | 8/2017 | Leutard .................. F01D 5/005 |
| 2019/0249571 A1* | 8/2019 | Beach .................... F01D 25/26 |
| 2019/0271352 A1* | 9/2019 | Petty ......................... F23R 3/60 |

OTHER PUBLICATIONS

USPTO, Pre-Interview Office Action dated Apr. 20, 2017 in U.S. Appl. No. 14/600,239.

USPTO, First Action Interview Office Action dated Jun. 15, 2017 in U.S. Appl. No. 14/600,239.

USPTO, Notice of Allowance dated Sep. 18, 2017 in U.S. Appl. No. 14/600,239.

European Patent Office, European Office Action dated Oct. 26, 2018 in Application No. 16151959.0.

* cited by examiner

ENCLOSED JACKING INSERT

CROSS-REFERENCE TO RELATED APPLICATION

This application is a divisional of U.S. Ser. No. 14/600,239, filed Jan. 20, 2015, entitled "ENCLOSED JACKING INSERT," which is hereby incorporated by reference in its entirety.

FIELD OF INVENTION

The present disclosure relates to gas turbine engines, and, more specifically, to a jacking insert configured for disassembling interference snaps affixing a gas-turbine-engine case.

BACKGROUND

Cases on gas turbine engines may be assembled and fixed using interference snaps on adjacent flanges. The disassembly of a snap fit may involve jack screws, which thread into one member and push against the adjoined member. Thus, the adjacent flanges may be separated using a jack screw. A jacking insert may include a threaded cylinder attached to a small flange that takes the jacking load. The flange is sandwiched between the flanges of the components snapped together (e.g., adjacent segments of an engine case). The jacking feature may sit recessed in one of the two flanges to be snap-fit together. The recess is typically either circular or rectangular.

A circular jacking feature is not fixed against rotation within the recess and may spin when the jacking screws are in use. In many instances a second wrenching feature may be used to prevent a circular jacking feature from spinning. If the spot face is rectangular, the slot is usually cut through the flange so that it is easy to manufacture. However, in this manner, the thickness of the case flange that is full hoop is reduced and compromises the structural integrity of the case flange.

SUMMARY

A case assembly comprises a flange and a recess in the flange. The recess is defined by a spot face surrounded by a D-shaped wall. A jacking insert comprises a back plate disposed in the recess with a D-shaped geometry. A threaded cylinder extends from the back plate into the flange.

The case assembly further comprises a second flange that is snap fitted to the first flange. The jacking insert is at least partially between the first flange and the second flange. A bolt is configured to interface with the threaded cylinder. The bolt is configured to press the first flange and the second flange away from one another in response to the bolt entering the jacking insert. The spot face comprises a complete hoop around the jacking insert. The spot face has a contoured perimeter configured to limit rotation of the jacking insert. A bulkhead is pressed against the first flange and covers the spot face. A bolt is configured to pass through the jacking insert and an opening defined by the bulkhead.

A gas turbine engine comprises a static frame component with a first flange. A low-pressure compressor is aft of the static frame component. A case is disposed around the low-pressure compressor and located aft of the static frame component. The case includes a second flange. A jacking insert is between the first flange and the second flange.

The gas turbine engine further comprises a spot face in at least one of the first flange and the second flange with the jacking insert disposed in the spot face. The spot face comprises a contoured perimeter matching geometry of the jacking insert. The geometry of the jacking insert is D-shaped. A threaded cylinder extends from the jacking insert into the first flange. The second flange that is snap fitted to the first flange. A bolt is configured to interface with the threaded cylinder. The bolt is configured to press the first flange away from the second flange in response to the bolt entering the jacking insert. The spot face comprises a complete hoop around the jacking insert.

A jacking insert comprises a flat portion having a D-shaped geometry and a cylindrical portion having an internal thread configured to interface with a bolt.

The D-shaped geometry is configured to interact with a spot face to limit rotation of the jacking insert. The D-shaped geometry comprises a semicircular half and a square half.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
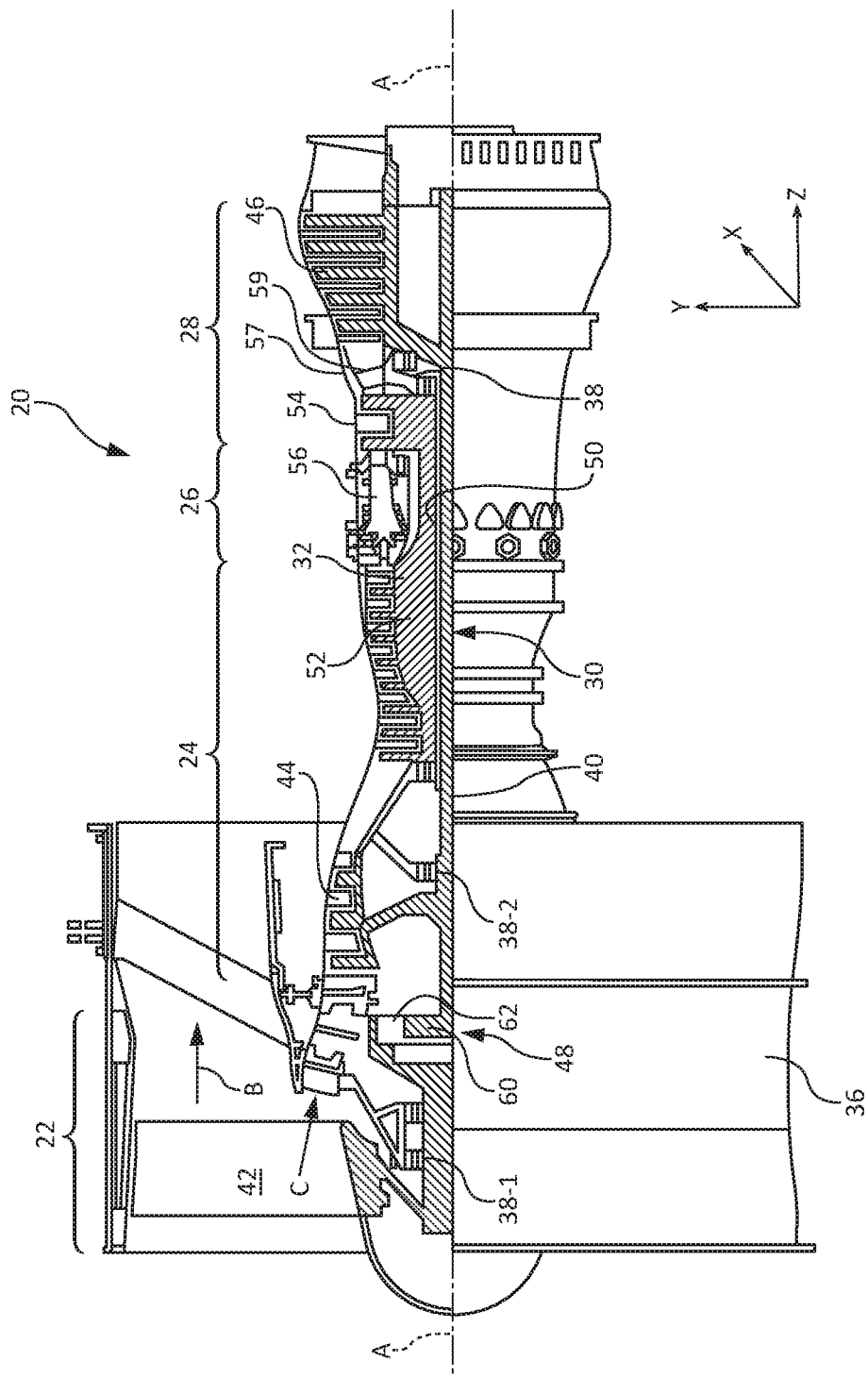
FIG. 1 illustrates a cross-sectional view of an exemplary gas turbine engine, in accordance with various embodiments.

With reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. A combustor 56 may be located between high-pressure compressor 52 and high-pressure turbine 54. A mid-turbine frame 57 of engine static structure 36 may be located generally between high-pressure turbine 54 and low-pressure turbine 46. As used herein, "mid-turbine frame" refers to a non-rotating or static structure between the high-pressure turbine 54 and low-pressure turbine 46. In three-spool engines having an intermediate turbine, a mid-turbine frame may be located between any of the high-pressure turbine, the low-pressure turbine, and/or the intermediate turbine. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Airfoils 59 may be formed integrally into a full-ring, mid-turbine-frame stator and retained by a retention pin. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 is greater than about six (6). In various embodiments, the bypass ratio of gas turbine engine 20 is greater than ten (10). In various embodiments, geared architecture 48 is an epicyclic gear train, such as a star gear system (sun gear in meshing engagement with a plurality of star gears supported by a carrier and in meshing engagement with a ring gear) or other gear system. Geared architecture 48 can have a gear reduction ratio of greater than about 2.3 and low-pressure turbine 46 has a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Engine static structure includes multiple case components that are interference fit together. Some case components of engine static structure 36, i.e., those that are interference fit, can be separated from one another using a jacking insert and screw. A jacking insert is a threaded female interface that provides a thread for a bolt. The bolt uses the thread to bottom out against another surface and press against the surface. In that regard, jacking inserts are used, in conjunction with a bolt, to separate tightly fitting components.

Figure 2:
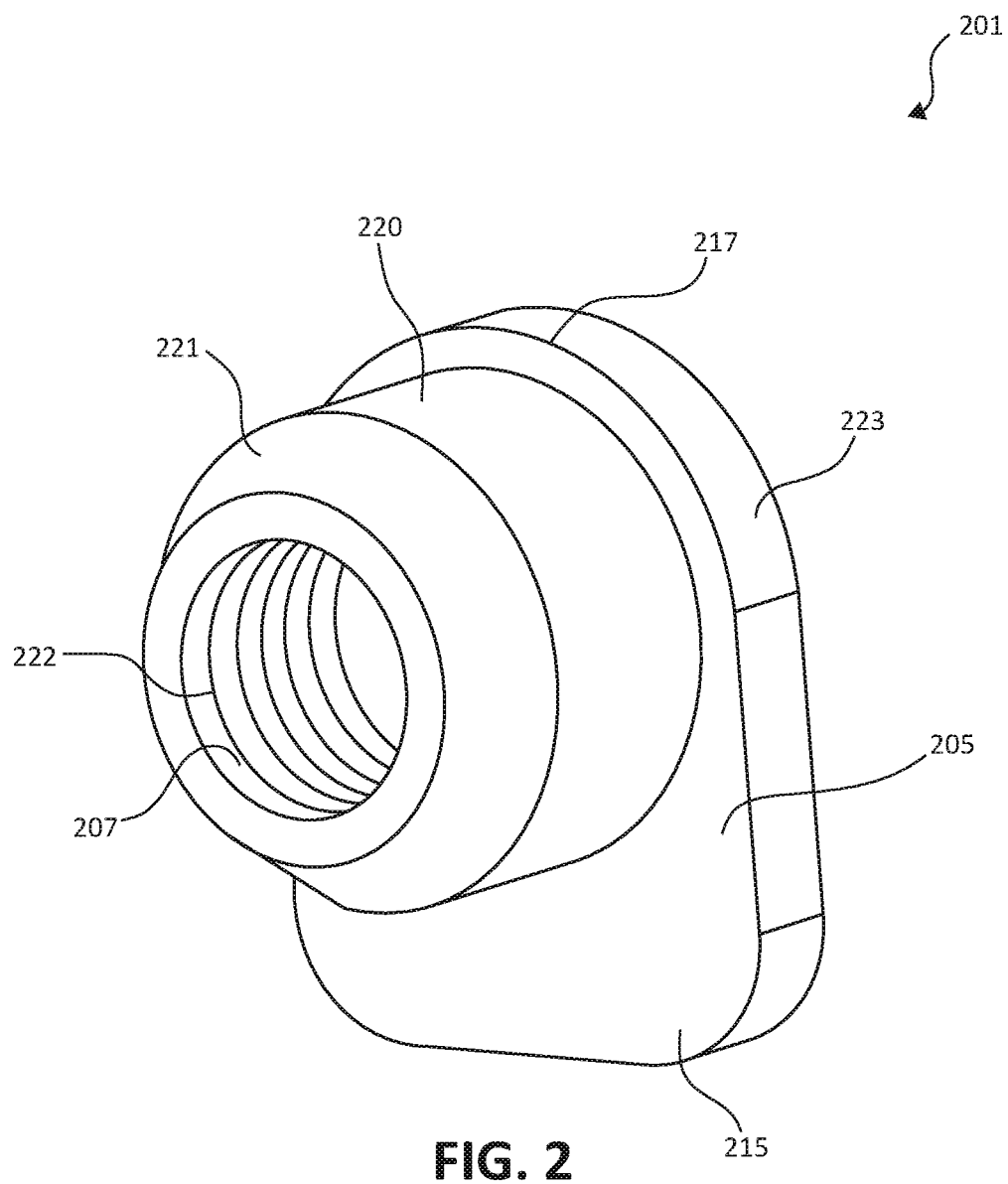
FIG. 2 illustrates a jacking insert with a D-shaped back plate, in accordance with various embodiments.

With reference to FIG. 2, a jacking insert 201 is shown. Jacking insert 201 includes back plate 205 made up of a round portion 217 and a square portion 215 opposite the round portion 217. Threaded cylinder 220 of jacking insert 201 includes a tapered tip 221. Opening 207 extends completely through jacking insert 201. Jacking insert 201 is made from a lightweight metal, e.g., aluminum or other metals. Opening 207 contains threads 222 to convert angular motion of a bolt or screw into linear motion. Jacking insert 201 has a back plate 205 with sidewall 223 of back plate 205 having a D-shaped geometry. The outer perimeter of jacking insert 201 defined by sidewall 223 and has 4 edges. Three of the four sides define the boundary of square portion 215, and the fourth side defines the boundary of round portion 217. Round portion 217 is essentially circular. Square portion 215 is essentially square but can have rounded corners and/or edges between sides. The D-shaped geometry of jacking insert 201 interfaces with a flange recess, as described in further detail below.

Figure 3:
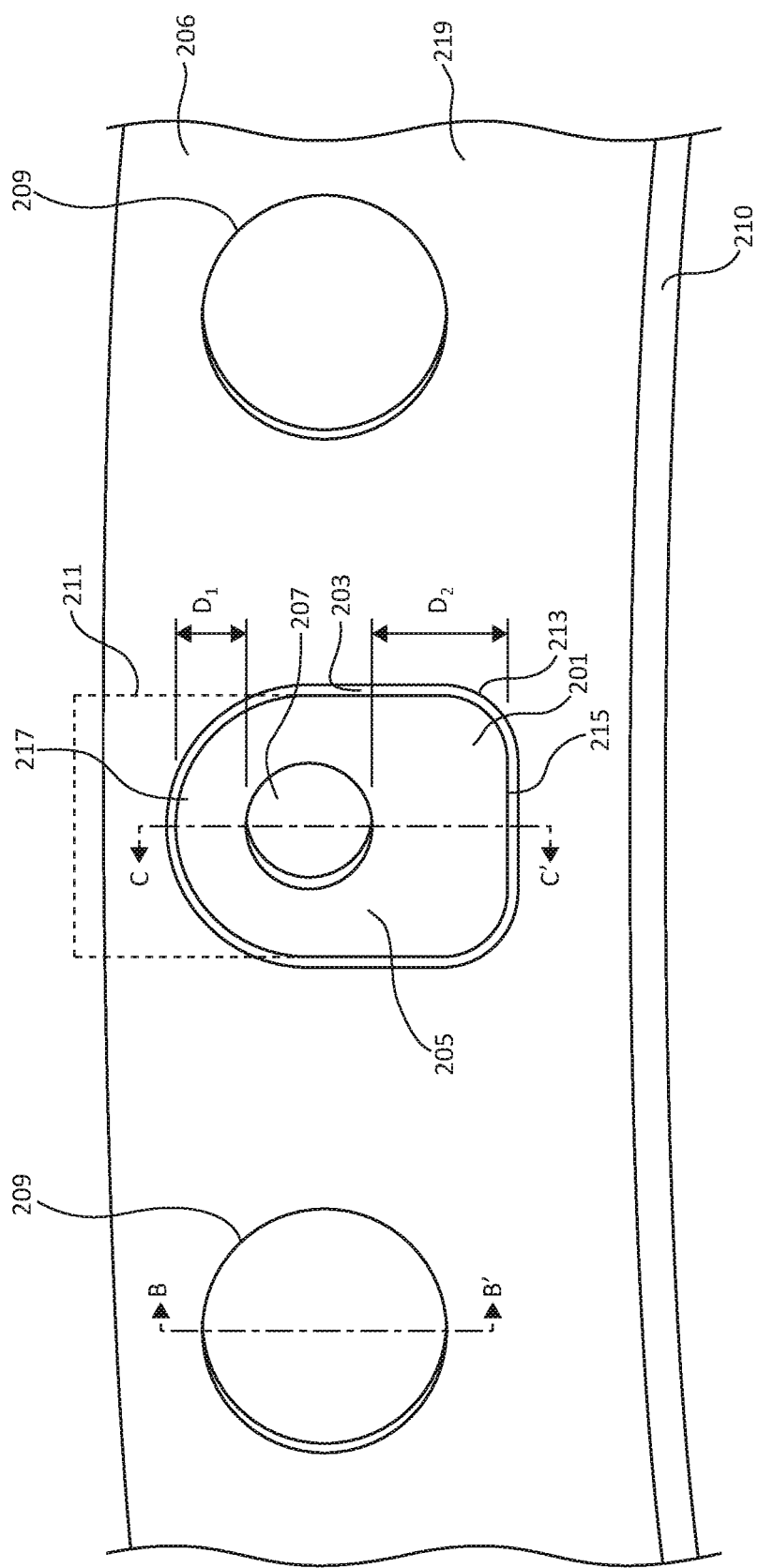
FIG. 3 illustrates a case flange with a jacking insert recessed into the flange between bolt holes, in accordance with various embodiments.

With reference to FIG. 3, a flange 206 is illustrated with a jacking insert 201 disposed in a recess between bolt holes 209. Flange 206 contacts static frame component 210. Static frame component 210 is similar to engine static structure 36 of FIG. 1. Jacking insert 201 is recessed into flange 206 with the recess of flange 206 defined by contoured wall 213 and spot face 203. Contoured wall 213 has a D-shaped contour to match the geometry of back plate 205. Spot face 203 is a recessed, flat surface located on flange 206. Jacking insert 201 contacts spot face 203 of flange 206 so that back plate 205 is flush or recessed relative to the surface of flange 206 surrounding spot face 203 outside of contoured wall 213. Spot face 203 is an impression in flange 206 having contoured wall 213 bounding spot face 203 on all sides. The contoured wall 213 has a contour to match the geometry of back plate 205 of jacking insert 201 and constrain jacking insert 201 from rotation.

Back plate 205 of jacking insert 201 has an asymmetric perimeter. For example, jacking insert 201 has a D-shaped perimeter comprising a round portion 217 and a square portion 215. Round portion 217 extends a shorter distance D1 from opening 207 than the distance D2 than square portion 215 extends from opening 207. Opening 207 is threaded to accept a screw and allow separation of components that are snap fit together, for example, multiple case pieces. Ghosted line 211 illustrates the shape of a jacking insert that would result if a square portion symmetric to square portion 215 replaced round portion 217. As shown by ghosted line 211, jacking insert would extend beyond the boundary of surface 219 such that contoured wall 213 of flange 206 would not define a complete hoop of flange material around jacking insert 201.

The constraint against rotation is implemented by the interface between the contoured wall 213 around a recess in flange 206 and jacking insert 201 inserted in the recess. Contoured wall 213 holds square portion 215 of jacking insert 201 in place as a bolt is screwed or otherwise placed into jacking insert 201, as described in further detail below. The sidewall of jacking insert 201 contacts contoured wall 213 of flange 206. Contoured wall 213 forms an unbroken, complete hoop around jacking insert 201 so that material of flange 206 encircles the sidewall of back plate 205.

Figure 4:
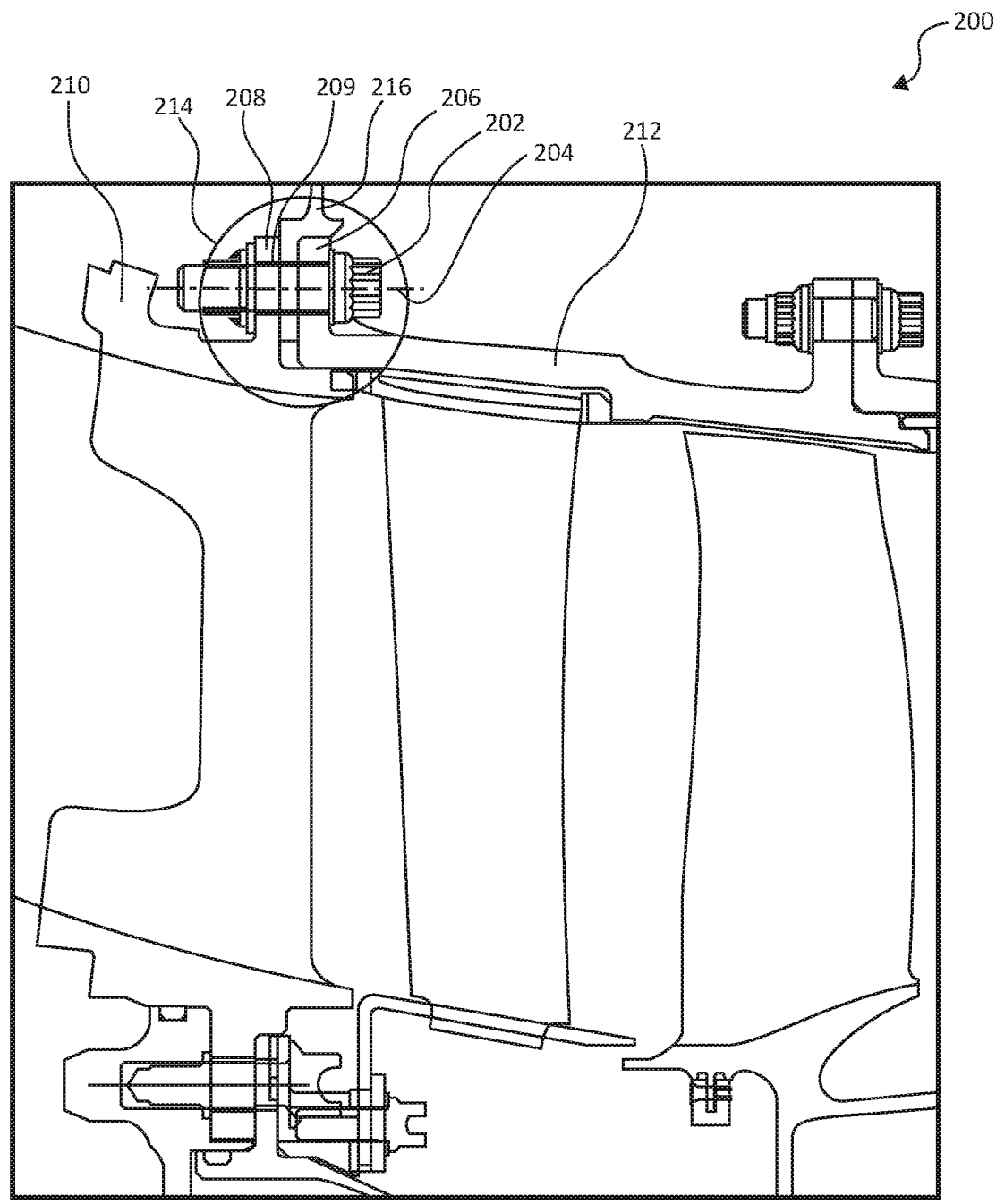
FIG. 4 illustrates a cross sectional view of a case bolted to a static frame component, in accordance with various embodiments.

With reference to FIG. 4, case assembly 200 comprises a case 212 bolted to a bulkhead 216 and a static frame component 210 as illustrated. Case 212 can be disposed around low-pressure compressor 44 of FIG. 1, for example. Case 212 is bolted to static frame component 210 at a forward location of low-pressure compressor 44. Case assembly 200 is illustrated so that the cross section of flange 206 along line B-B' in FIG. 2 is included in area 214 of FIG. 3. Bolt 202 is configured to rotate about axis 204. Axis 204 is also be centrally located in bolt hole 209. Case 212 has flange 206 that is coupled to bulkhead 216 and flange 208 of static frame component 210.

Figure 5:
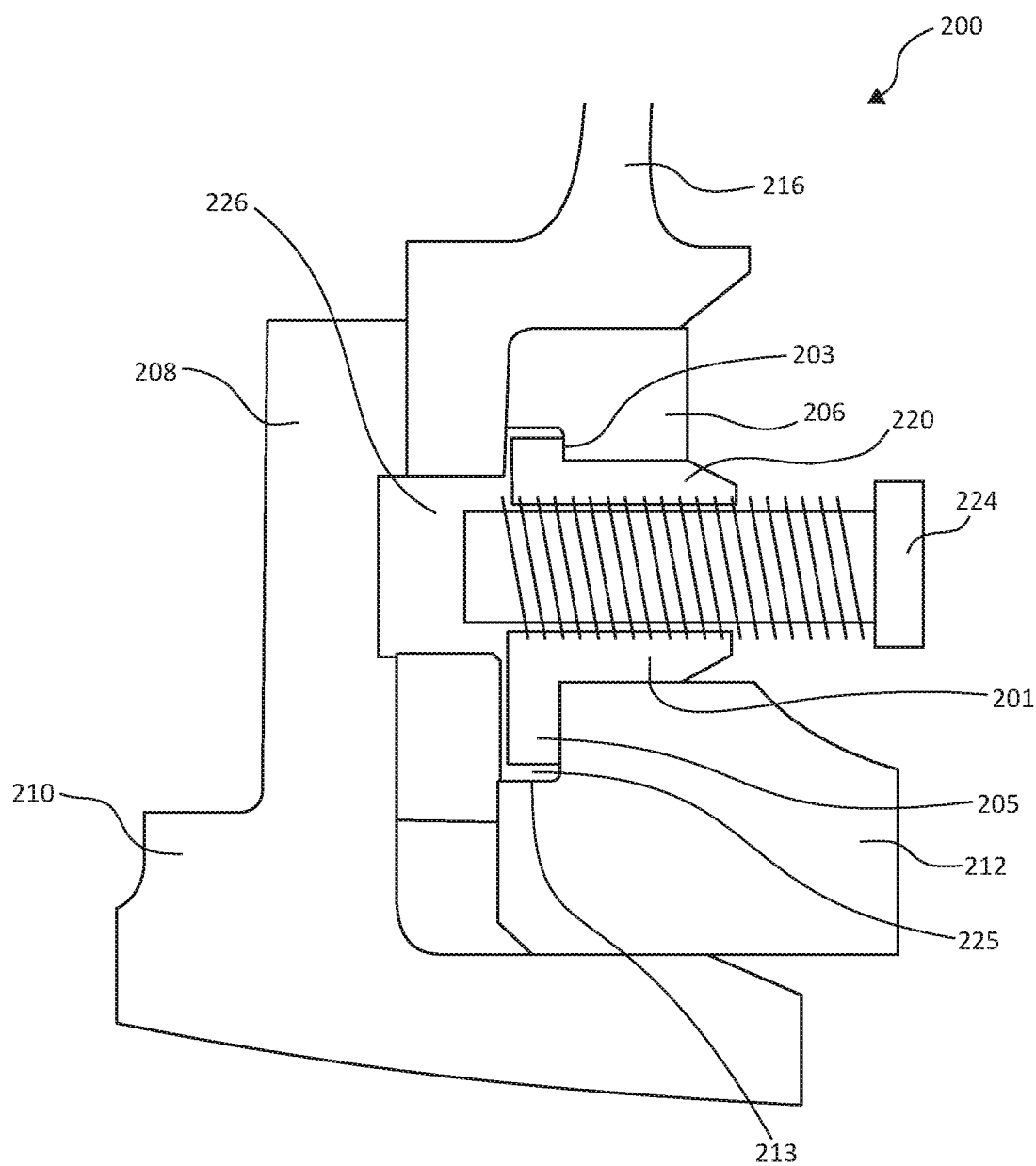
FIG. 5 illustrates a cross sectional view of a case assembly snap fitted together with a bolt and a jacking insert for unsnapping the case assembly, in accordance with various embodiments.

With reference to FIG. 5, case assembly 200 including case 212 press fit together with static frame component 210 is shown. Case assembly 200 is illustrated to include the cross section of flange 206 and jacking insert 201 along line C-C' in FIG. 2. Recess 225 is defined by spot face 203 and contoured wall 213 of flange 206. Back plate 205 of jacking insert 201 is disposed within recess 225 and between bulkhead 216 and flange 206. Flange 206 is retained against bulkhead 216 and static frame component 210 by a snap fit. The snap fit may require large forces to unsnap during disassembly.

Bolt 224 is inserted into threaded cylinder 220 of jacking insert 201 and screwed into threaded cylinder 220. Bolt 224 may screw through jacking insert 201 and extend through clearance opening 226 in bulkhead 216. Bolt 224 may then bottom out against flange 208 and urge flange 206 and flange 208 away from one another. The separating force applied by bolt 224 pressing against flange 208 unsnaps any snap fittings and furthers disassembly of the engine. The anti-rotation characteristics of jacking insert 201 recessed in flange 208 enables bolt 224 to screw into jacking insert 201 without the use of a second tool to prevent rotation. Jacking insert 201 may be replaced when damaged and prevent replacement of case 212 or static frame component 210.

Benefits, other advantages, and solutions to problems have been described herein with regard to specific embodiments. The scope of the disclosure, however, is provided in the appended claims.

What is claimed is:

1. A gas turbine engine, comprising:
a static frame component comprising a first flange;
a low-pressure compressor aft of the static frame component;
a case around the low-pressure compressor and aft of the static frame component, the case comprising a second flange;
a bulkhead disposed between the first flange and the second flange, the second flange being retained against both the bulkhead and the static frame component by a snap fit, the bulkhead including a clearance opening; and
a jacking insert having a D-shaped back plate configured for positioning within a D-shaped recess disposed within the second flange, the jacking insert further having a cylinder extending from the D-shaped back plate and through the second flange and a threaded opening in alignment with the clearance opening and extending through both the back plate and the cylinder.

2. The gas turbine engine of claim 1, wherein the D-shaped recess is defined by a contoured sidewall matching a geometry of the D-shaped back plate.

3. The gas turbine engine of claim 2, further comprising a bolt configured to interface with the threaded opening and to extend through the clearance opening to bottom out against the first flange.

4. The gas turbine engine claim 3, wherein the bolt is configured to press the first flange away from the second flange in response to the bolt bottoming out against the first flange.

5. The gas turbine engine of claim 4, wherein the first flange comprises a complete hoop around the D-shaped flange.

* * * * *